United States Patent [19]
King

[11] Patent Number: 5,311,409
[45] Date of Patent: May 10, 1994

[54] COLLAPSIBLE PHOTOGRAPHIC LIGHT DIFFUSER

[75] Inventor: Jack N. King, Davidson, N.C.

[73] Assignee: Camera World, Inc., Charlotte, N.C.

[21] Appl. No.: 76,536

[22] Filed: Jun. 14, 1993

[51] Int. Cl.⁵ .................................. G03B 15/02
[52] U.S. Cl. .................... 362/17; 362/320; 362/343; 362/352
[58] Field of Search .......... 362/16, 17, 18, 352, 362/356, 357, 320, 343

[56] References Cited

U.S. PATENT DOCUMENTS

| | | | |
|---|---|---|---|
| 2,205,860 | 6/1940 | Olds | 362/17 |
| 4,052,607 | 10/1977 | Larson | 362/18 |
| 4,446,506 | 5/1984 | Larson | 362/17 |
| 4,490,776 | 12/1984 | Kluch | 362/16 |
| 4,504,888 | 3/1985 | Rosenthal | 362/18 |
| 4,616,293 | 10/1986 | Baliozian | 362/7 |
| 4,807,089 | 2/1989 | Nüssli | 362/17 |
| 5,023,756 | 6/1991 | Regester | 362/16 |
| 5,023,757 | 6/1991 | Shirilla | 362/16 |
| 5,154,503 | 10/1992 | Sternsher | 362/16 |

Primary Examiner—Stephen F. Husar
Attorney, Agent, or Firm—Bell, Seltzer, Park & Gibson

[57] ABSTRACT

A photographic light diffuser includes a tubular body which is adapted to be mounted on a photographic light source and when so mounted is self-supporting without an internal or external supporting frame or without removably connected rigidly panels, the tubular body has pairs of opposed wall panels, at least one pair of which has fold lines therein along which the wall panels may be folded to collapse the tubular body into a flattened, compost form for portability. A light diffuser panel is mounted on the outer end of the tubular body and the inner end of the tubular body has mounting means for mounting the light diffuser on a light source.

25 Claims, 5 Drawing Sheets

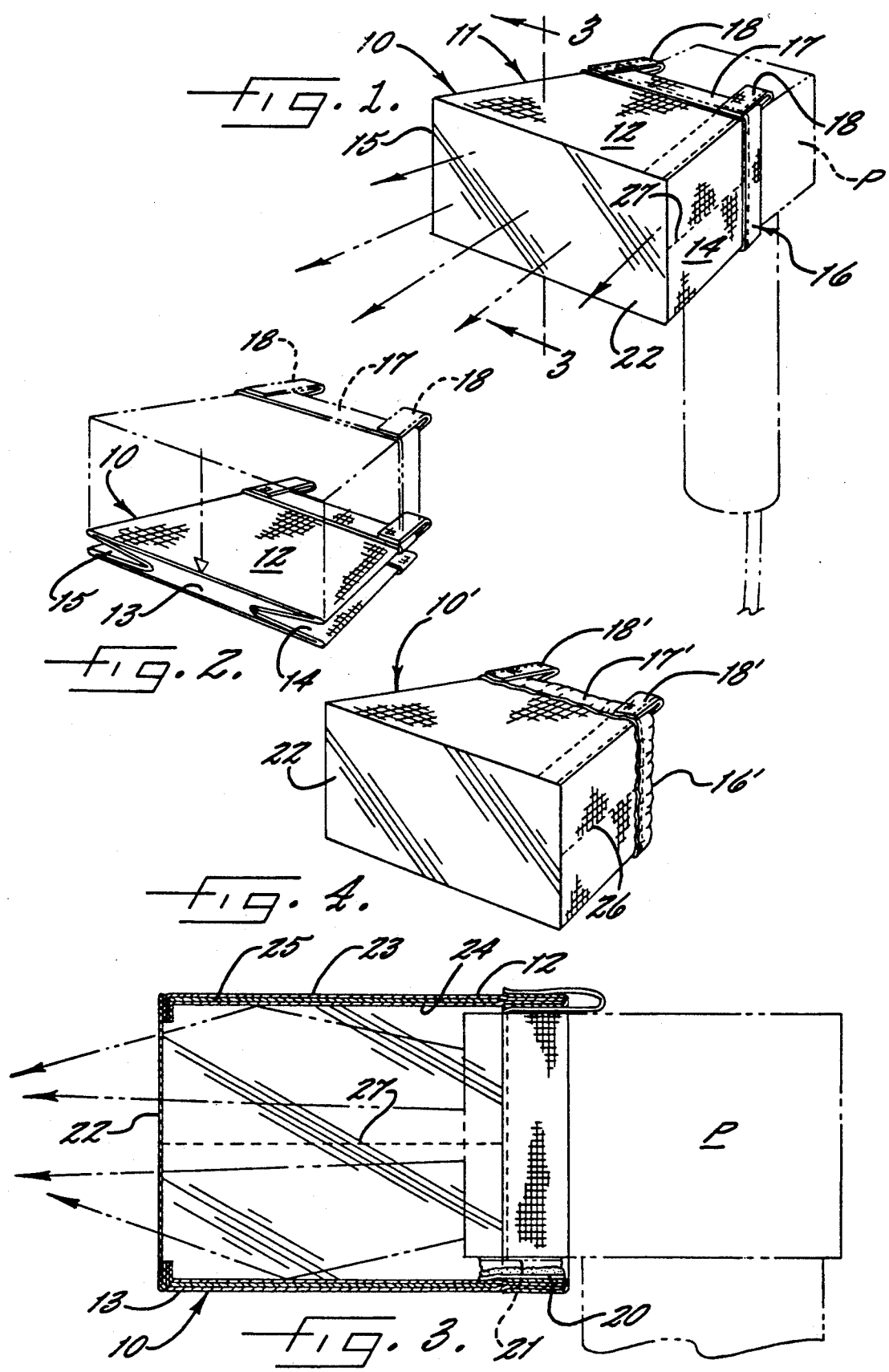

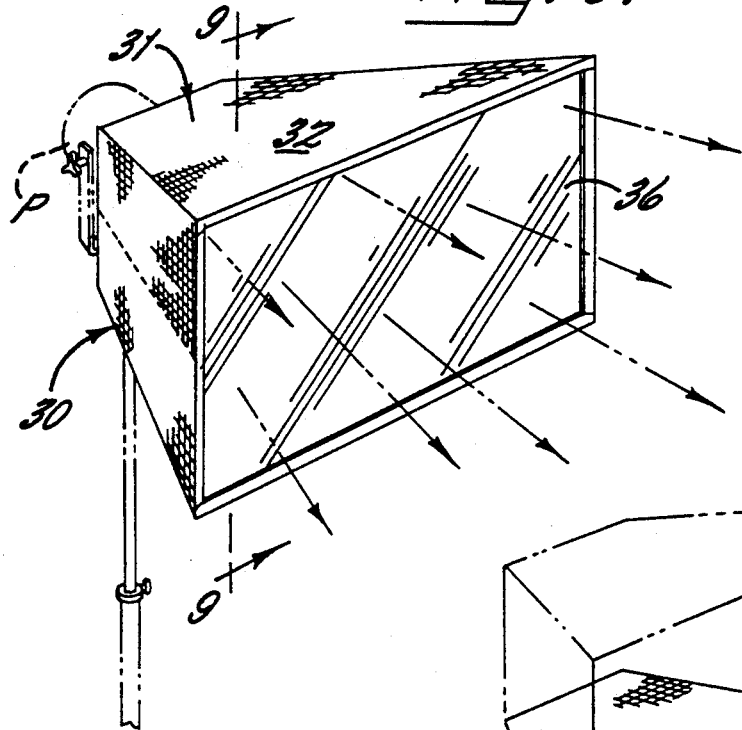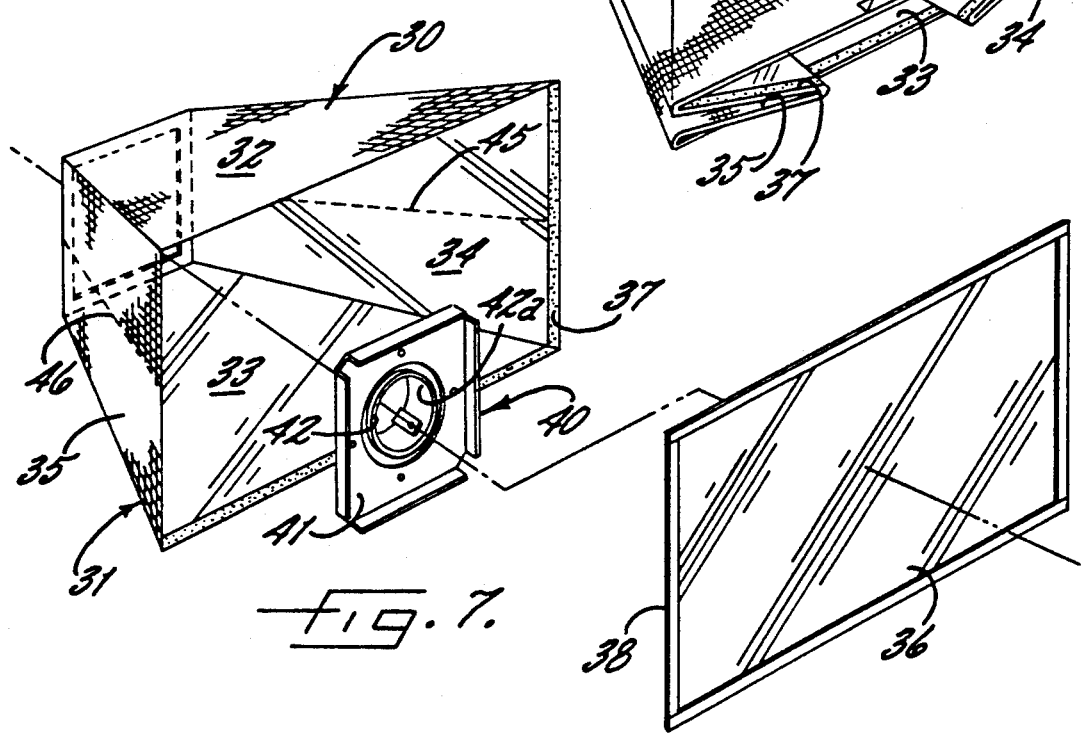

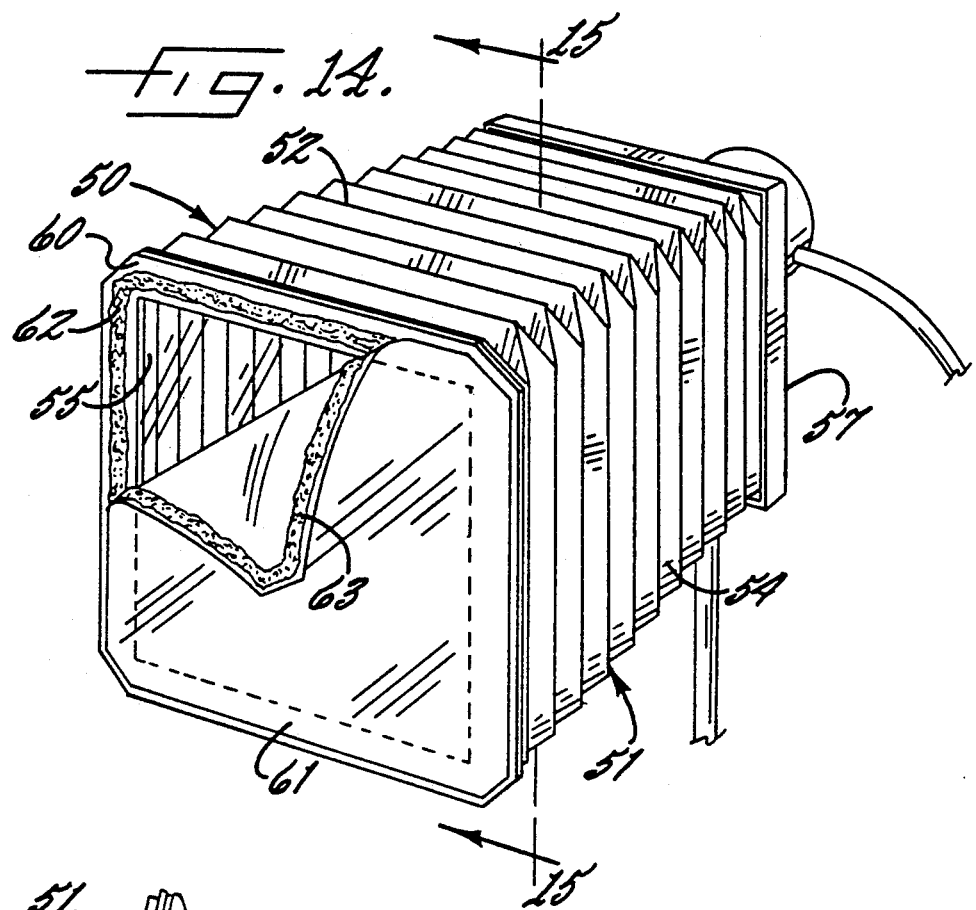
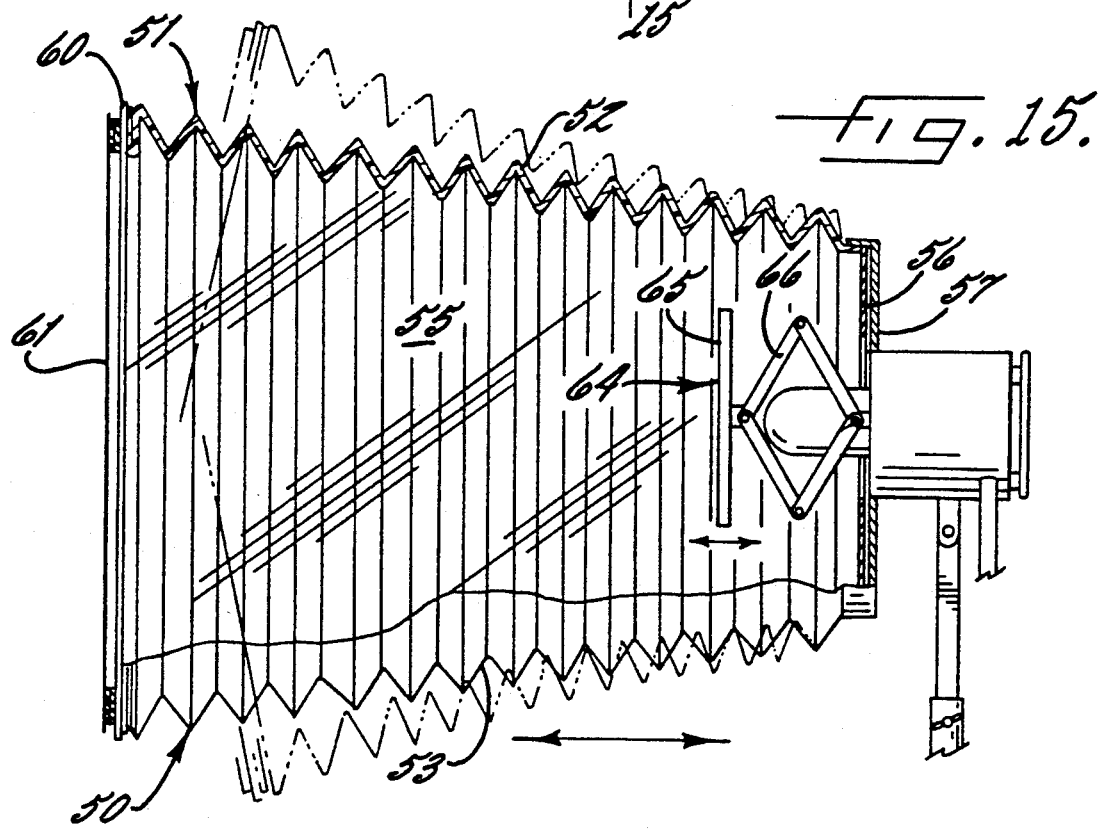

COLLAPSIBLE PHOTOGRAPHIC LIGHT DIFFUSER

FIELD OF THE INVENTION

The present invention relates to photographic light diffusers and more particularly to a photographic light diffuser which is collapsible into a compact, easily portable form.

BACKGROUND OF THE INVENTION

Light diffusers are frequently used by photographers in portrait and other types of photography where specific lighting effects are desired. Typically, such light diffusers comprise stationary or non-collapsible or non-foldable types of screens which are bulky and cumbersome and are neither compact nor readily portable. Such devices may be adequate for permanent photographic studios where there is no need to transport the lighting equipment, including the light diffusers from place to place.

However, it is frequently necessary or desirable to transport photographic equipment, including lighting equipment, to various locations where the photographs are to be taken. With this in mind, lighting apparatus, including suitable light sources, such as strobe lights, etc. which are readily portable from one location to the other, have been made available and are currently in widespread use. Similarly, light diffusers, which may be disassembled into a more compact, disassembled form and then setup or reassembled at a different location, are also available to photographers. Such prior light diffusers invariably include internal supporting frameworks radiating from a backplate with flexible covers supported by the framework or rigid panels which can be assembled or disassembled in place and connected together to form the light diffusing device. The disassembly and reassembly of such prior light diffusers is a time consuming and laborious process and is one that may result in the loss of one or more parts of the supporting framework if extreme care is not exercised in the transporting of the disassembled frameworks and flexible covers.

With the foregoing in mind, it is an object of the present invention to provide a light diffuser which is readily collapsible into a flattened, compact, portable form which does not involve the disassembly or reassembly of any supporting frameworks or rigid panels.

SUMMARY OF THE INVENTION

The foregoing object of the present invention is accomplished by providing a light diffuser which comprises a tubular body formed of opposing pairs of wall panels interconnected along the contiguous edges thereof. Means for mounting the tubular body on a suitable light source is provided at one end of the tubular body and a front light diffusing panel is mounted across the other end of the tubular body. The tubular body is formed of opaque material having a light-reflective surface on the inside thereof such that light attempting to pass outwardly through the tubular body is reflected onto the front light diffusing panel. Similarly, light attempting to enter the tubular body from the outside will be prevented from doing so by the opaque material thereof. the material of which the tubular body panel is formed is sufficiently stiff or rigid to be self-supporting but is not so rigid as to not permit the light diffuser to be collapsed into a flattened, compact form.

At least one opposing pair of wall panels forming the tubular body have fold lines therein defining hinge areas, about which these panels may be folded to collapse the light diffuser into a flattened, compact form which is easily and readily portable. When desired for reuse, the light diffuser may be extended to its fully open form and attached to a light source and will then be self-supporting and remain in the open operative form until removed from the light source and collapsed to the flattened, compact form.

Some of the objects having been stated, other objects will appear as the description proceeds, when taken in connection with the accompanying drawings in which

BRIEF DESCRIPTION OF THE DRAWINGS

FIG. 1 is a perspective view of one embodiment of the light diffuser of the present invention adapted for use with a hand-held photographic light source;

FIG. 2 is a perspective view similar to FIG. 1 but partially in section, illustrating the light diffuser of FIG. 1 collapsed into the compact, portable form;

FIG. 3 is a view similar to FIG. 1 illustrating a different means for attaching the light diffuser to the light source;

FIG. 4 is an enlarged longitudinal sectional view taken substantially along line 4—4 in FIG. 1;

FIG. 5 is a perspective view illustrating another embodiment of the light diffuser of the present invention attached to a stationary light source;

FIG. 6 is a view similar to FIG. 2 illustrating the light diffuser illustrated in FIG. 5 in collapsed form;

FIG. 7 is an exploded perspective view of the light diffuser illustrated in FIG. 5;

FIG. 14 is a perspective view of still another embodiment of the light diffuser of the present invention shown attached to a stationary light source; and FIG. 15 is a longitudinal sectional view taken substantially along line 15—15 in FIG. 14.

DETAILED DESCRIPTION OF THE ILLUSTRATED EMBODIMENTS

Figure 13:
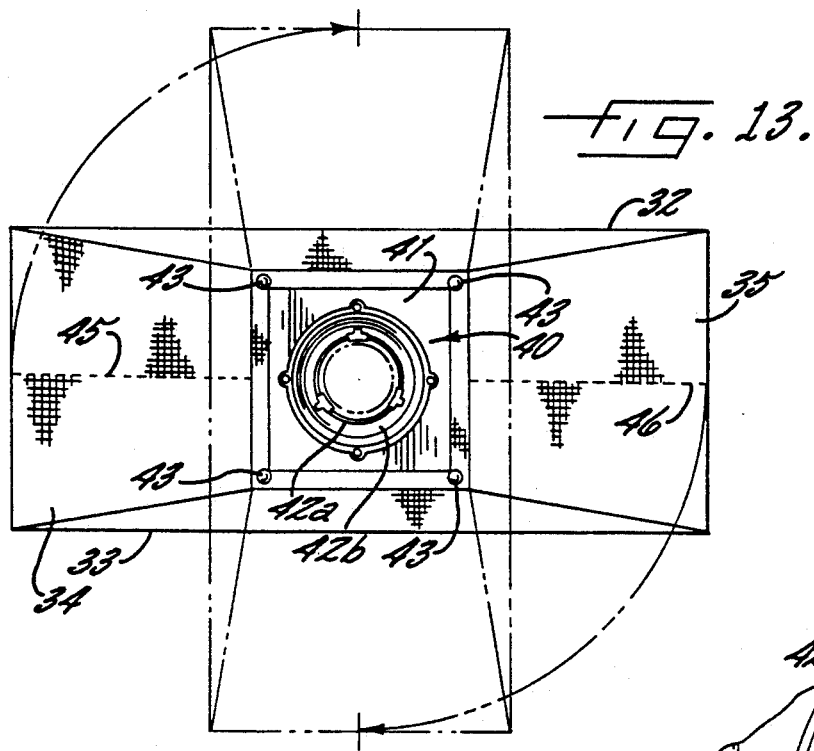
FIG. 13 is a rear elevation view of the light diffuser illustrated in FIGS. 5-12 illustrating how the light diffuser may be rotated with respect to the light source.

Referring now more specifically to the drawings and particularly to FIGS. 1-4, there is illustrated therein a light diffuser, generally indicated at 10, which incorporates the features of the present invention. Light diffuser 10 is preferably for use with a hand-held photographic light source P, such as a common photographic strobe light.

Light diffuser 10 includes a tubular body 11 defined by a top wall 12, a bottom wall 13 and opposing side walls 14 and 15 connected together or integral along their contiguous edges. Preferably, top and bottom walls 12 and 13 are trapezoidal in shape while side walls 14 and 15 may be either trapezoidal or rectangular.

Tubular body 11 has provided therein means 16 for mounting the light diffuser 10 on the light source P. As illustrated in FIGS. 1-4, mounting mean 16 includes a hem 17 which extends continuously around the inner end of the tubular body 11 encompassing the inner ends of the top and bottom walls 12, 13 and side walls 14, 15 therein. If desired, loops 18 may be provided on the hem 17 at opposite inner corners of the top wall 12 for ease in grasping and pulling the light diffuser 10 onto the light source P. Also, mounting means 16 includes hook and loop means 20, 21 mounted respectively on the inside of the hem 17 at opposite inner corners of the bottom wall 13 and on the bottom of the light source P to releasably retain the light diffuser 10 on the light source to prevent accidental dislodgement thereof.

Alternatively, as is illustrated in FIG. 4, mounting means 16' may include a hem 17', finger loops 18', and an elastic member (not shown) incorporated within hem 17'. In this manner, the inner end of the light diffuser 10' expands and contracts about the light source P to elastically retain the light diffuser 10' on the light source P.

Light diffuser 10 further includes a front wall panel 22 which is translucent and permits light to pass from the light source P therethrough to diffuse the light passing therethrough. As illustrated, front panel 22 is secured to the outer ends of the top, bottom and side walls 12-15, inclusive. The front panel 22 may be secured to the tubular body 11 by any suitable means such as stitching, adhesive, etc.

The tubular body member 11 is formed of opaque material which will not permit light to pass therethrough either from the outside into the interior of the light diffuser 10 or from the light source P outwardly through the top, bottom and side walls 12-15, inclusive.

The inner surfaces of the top, bottom and side walls 12-15, inclusive, are light-reflective so as to reflect any light from the light source P striking these inner surfaces outwardly onto the front panel 22. In this manner, substantially all of the light emanating from the light source P passes outwardly through front panel 22 and is diffused thereby.

The tubular body 11 is formed of a material which has sufficient stiffness to maintain the tubular body 11 in open, tubular form when the tubular body 11 is mounted on a light source. The opaque material forming tubular body 11 may be of a single layer having sufficient inherent stiffness to maintain the tubular body in self-supporting form or may be of a plurality of layers of different materials providing the opaqueness, light reflection and stiffness required for the self-supporting characteristics thereof. As illustrated, the tubular body 11 is formed of an outer layer 23 of flexible fabric which is opaque and, preferably, light-absorptive, an inner layer 24 of light-reflective material, such as a coated fabric or foil, and an intermediate layer 25 of plastic or other material imparting stiffness to the wall panels 12-15, inclusive.

At least one opposing pair of the wall panels 12-15, inclusive, have fold lines 26, 27 therein defining hinge areas along which said opposing pair of panels may be folded to collapse said tubular body 11 into a compact, flattened form for easy portability as is illustrated in FIG. 2. Preferably, the side wall panels 14 and 15 have fold lines 26 and 27 extending from the inner ends to the outer ends thereof, such that these panels may be folded inwardly along the fold lines 26, 27 into flattened form. In such flattened form, the top and bottom wall panels 12 and 13 are brought into close proximity to each other and the side wall panels 14, 15 form gussets therebetween. In side wall panels 14, 15, the intermediate layers 25 consist of two separate layer portions spaced apart by lines of stitching defining the fold lines 26, 27. When the tubular body 11 is in open tubular form, the intermediate layer portions in side wall panels 14 and 15 abut against the lines of stitching 26 and 27 and support the tubular body 11 in its open form.

Referring now more particularly to FIGS. 5-13, there is illustrated therein another embodiment of the photographic light diffuser of this invention generally referred to at 30. Light diffuser 30 is adapted for use with a stationary photographic light source, such as a conventional photographic strobe light mounted on a suitable stand.

Light diffuser 30 includes a tubular body 31 which is self-supporting when in open, erected form, but which is collapsible into flattened, compact form. Tubular body 31 includes a top wall panel 32, a bottom wall panel 33 and opposed side wall panels 34, 35. The wall panels 32-35, inclusive, are formed of opaque material which has sufficient stiffness to maintain the tubular body 31 in erected operative form when light diffuser 30 is mounted on a light source. Accordingly, light diffuser 30 is self-supporting without any additional internal or external frames, support members, etc. The wall panels 32-35, inclusive, have a light-reflective surface on the inside thereof and opaque, light-blocking surface on the outside thereof. Preferably, the light-reflective surfaces on the inside of wall panels 32-35 consist of silver or foil surfaces that are highly light-reflective, while the outside is of a black, light-absorptive material.

In the drawings, the wall panels 32-35 are illustrated as being of a single layer in thickness because of the scale of the drawings. However, it is preferred that the wall panels 32-35 have the same multi-layer construction as wall panels 12-15 described above.

The wall panels 32-35, inclusive, are preferably trapezoidal in shape and define an inner end of the tubular body 31 that is adapted to be mounted on a stationary photographic light source and an outer, larger end opposite the light source. The outer end of tubular body 31 is closed by a light diffuser member or panel 36, which is preferably removably mounted on the outer end of the tubular body 31 by hook and loop means 37, 38, such as a Velcro fastener.

Removably mounted on the inner end portion of tubular body 31 is a mounting means 40 for mounting the light diffuser 30 on the stationary photographic light source. The mounting means 40 includes a metal or plastic solid backplate 41 having a tubular member 42 mounted thereon for connecting the plate 41 to the stationary light source. Preferably, the tubular member 42 includes a rotatable inner portion 42a and a stationary outer portion 42b, such that the light diffuser 30 may be rotated relative to the light source, as illustrated in FIG. 11, to achieve different lighting effects.

Figure 12:
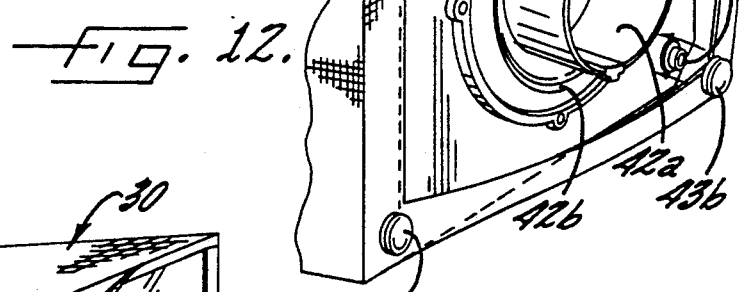
FIG. 12 is a fragmentary enlarged perspective view of the mounting plate of the light diffuser illustrated in FIGS. 5-11.
Figure 8:
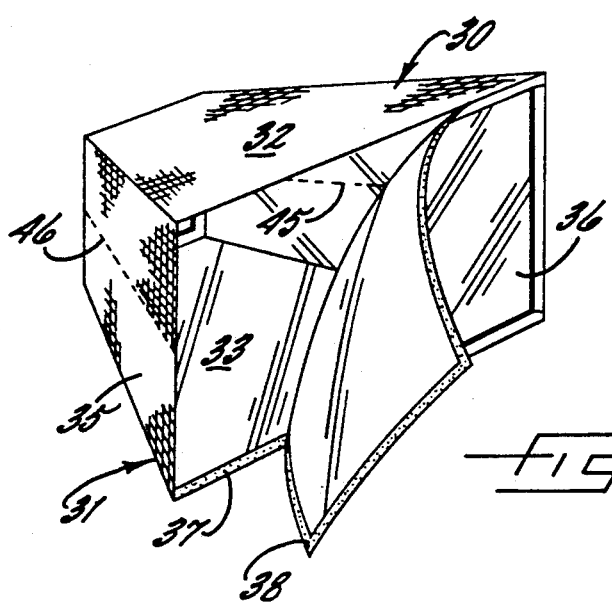
FIG. 8 is a perspective view of the light diffuser of the present invention illustrated in FIG. 5 showing the removability of the front translucent panel.

The mounting means 40 is removably connected to tubular body 31 by connecting means 43 which includes male and female snap portions 43a and 43b (FIG. 12). While the snap means heretofore described and illustrated in FIG. 12 are preferred, any suitable connection means 43 for connecting the tubular body 31 to the mounting means 40 may be employed.

At least one pair of the opposing wall panels 32-35, inclusive, have fold lines 45, 46 therein defining hinge areas about which these walls can be folded to cause the tubular body 31 to assume a flattened, compact form, as is illustrated in FIG. 6. Mounting means 40 should be removed from the inner end of the tubular body 31 before attempting to collapse the light diffuser 30. While it is not necessary to remove the front diffuser panel 36 from the tubular body 31, it is preferred that the front diffuser panel 36 be removed before the tubular body 31 is collapsed. In this regard, it is easier to remove the mounting means 40 through the front or outer end of the diffuser 30 than through the smaller inner end thereof.

Figure 10:
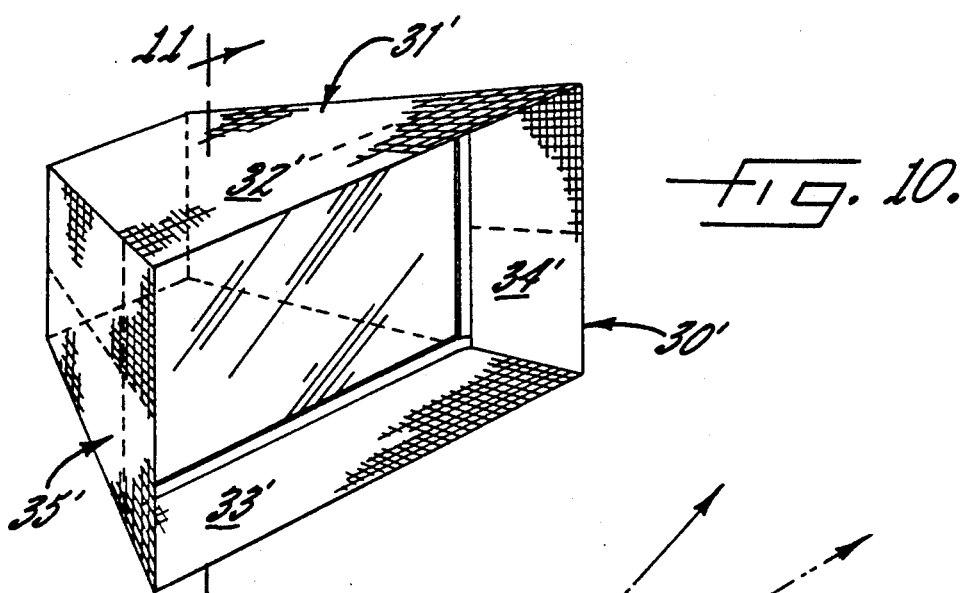
FIG. 10 is a perspective view similar to FIG. 5 without the light source being illustrated of still another embodiment of the light diffuser of the present invention.
Figure 11:
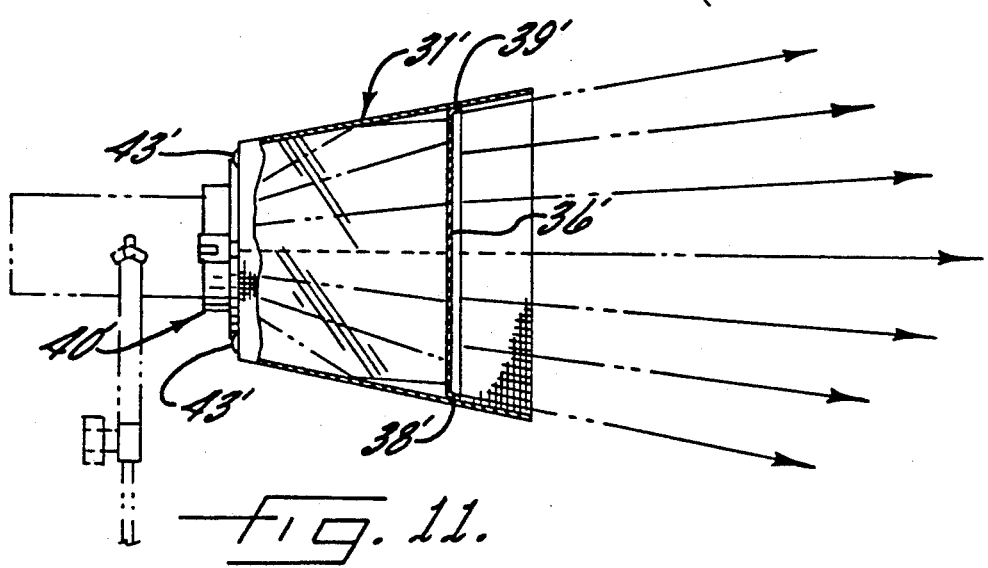
FIG. 11 is a longitudinal sectional view taken substantially along 11—11 in FIG. 10.

Referring now to FIGS. 10 and 11, there is illustrated another embodiment of the light diffuser of the present invention which is similar to the light diffuser 30 illustrated in FIGS. 5-9 and therefore the same reference characters with the prime notation added will be used to indicate like elements. In FIG. 10, there is illustrated a light diffuser 30' having a tubular body 31''. Tubular body 31' includes top, bottom and side wall panels 32', 33', 34' and 35', respectively. These wall panels 32' through 35', inclusive, have sufficient stiffness to make the tubular body 31' self-supporting when a mounting means 40' is connected to the inner end thereof by suitable connecting means 43'.

A front light diffuser panel 36' is removably mounted in the tubular body 31' at an intermediate location between the inner and outer ends of tubular body 31'. Attachment means 38', 39', preferably in the form of Velcro fasteners, is provided on the inside of tubular body 31' and on the outer periphery of front diffuser panel 36'. The inner surfaces of the wall panels 32', 33', 34' and 35' between the inner end of the tubular body 31' and the front diffuser panel 36' are light-reflective while the inner surface of those wall panels 32' through 35' between the front diffuser panel 36' and the outer end of tubular body 31' are opaque, light-absorptive rather than light-reflective.

Figure 9:
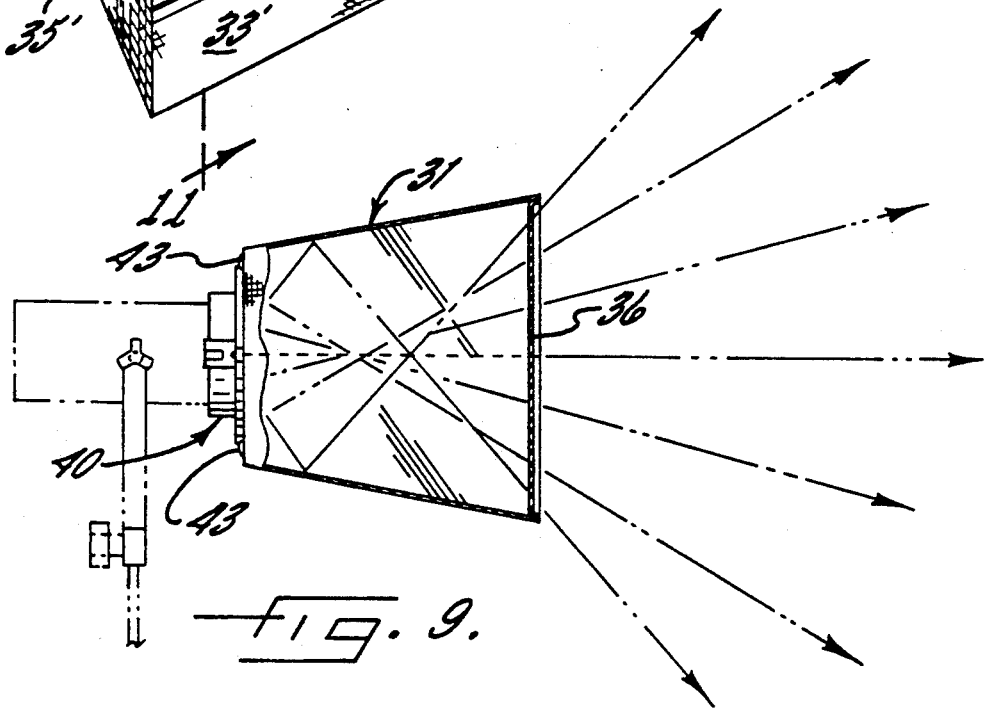
FIG. 9 is a longitudinal sectional view taken substantially along line 9—9 in FIG. 5.

FIGS. 9 and 11 illustrate the difference in light patterns between the light diffusers 30 and 30' of the present invention. With the front diffuser panel 36' recessed, a more controlled, localized, diffused light is achieved. With the front panel 36 mounted at the outer end of tubular body 31, a wider, more scattered, diffused light is emitted.

Referring now to FIGS. 14 and 15 of the drawings, still another embodiment of the light diffuser according to the present invention is generally indicated at 50. Light diffuser 50 includes a tubular body 51 which includes a top wall panel 52, a bottom wall panel 53, and opposing side wall panels 54, 55. These wall panels are formed integral or are connected along their contiguous edges to define the tubular body 51. The wall panels 52-55, inclusive, are preferably trapezoidal in shape with the smaller ends thereof at the inner end of the tubular housing 51 and the larger ends thereof at the outer end of tubular housing 51.

The wall panels 52-55, inclusive, of tubular body 51 are formed of an opaque material which has sufficient stiffness to make the tubular body 51 self-supporting. The inner surfaces of the wall panels 52-55, inclusive, are light-reflective, while the outer surfaces thereof are light-absorptive. The wall panels 52-55 are, therefore, opaque and confine the light from the light source within the tubular body 51 and prevent the incursion of outside light into the interior tubular body 51.

Wall panels 52-55, inclusive, each have a plurality of fold lines extending transversely thereacross to define a multiplicity of parallel hinge areas and to form the tubular body member 51 into an accordion folded, bellows-like member. Due to the fold lines and hinge areas defined in the wall panels 52-55, tubular body 51 is collapsible and extendable longitudinally between a flattened, compact form for portability and an extended, open form for use. The bellows-like character of tubular body 51 also permits the length of tubular body 51 to be varied for different lighting effects.

The inner end of tubular body 51 has mounted thereon a mounting plate 56. Plate 56 is, in turn, mounted on mounting means 57 for mounting the tubular body 51 on a suitable photographic light source (FIG. 15).

The outer ends of wall panels 52-55 of tubular body 51 have a frame member 60 mounted thereon to reinforce the outer ends of wall panels 52-55 and to serve as a mount for a front diffuser panel 61. Preferably, front diffuser panel 61 is removably mounted on frame member 60 by a hook and loop fastening means 62, 63, such as Velcro fasteners. In this manner, front diffuser panel 61 may be removed and reapplied to the front of the tubular body 51 to permit access to the interior of the light diffuser 50.

An optional feature of the light diffuser 50 is an accessory mounting means 64. Accessory mounting means 64 is carried by mounting means 57 for providing photographic light accessories, such as filters and other light modifying means internally of the light diffuser 50. Accessory mounting means 64 includes a mounting frame 65 for the receipt of filters, lenses or other light modifying means and toggle linkage means 66 which mounts frame 65 on mounting means 57. By toggle linkage means 66, the position of accessory mounting frame 65 may be varied longitudinally of the tubular body 51 to vary the spacial relationship between the light modification means and the light source.

When a photographer desires to use light diffuser 10, he/she removes the same from its carrying case or accessory bag (not shown) and expands tubular body 11 into its open, erected form by moving top and bottom wall panels 12 and 13 apart. This unfolds side wall panels 14 and 15 and light diffuser 10 may then have its inner end pulled onto a hand-held light source. Light diffuser 10 is then self-supporting and may be used until the photographer is finished therewith. Light diffuser 10 may then be removed from the light source and collapsed into its flattened, compact form for easy portability.

Light diffusers 30 and 30' are used similarly to light diffuser 10 except that after tubular bodies 31 and 31' are moved to their open, erected form, mounting means 40 and 40' are inserted into the inner ends of tubular bodies 31 and 31' and secured there by connecting means 43 and 43'. Light diffusers 30 and 30' may then be mounted on suitable light sources. If front diffuser panels 36 and 36' had been removed during the insertion of mounting means 40 and 40', then front panels 36 and 36' must be mounted on tubular bodies 31 and 31'. The reverse of the foregoing procedure should be followed once the photographer is finished with light diffusers 30, 30' to return the same to their flattened, compact form.

Light diffuser 50 is used similarly to light diffusers 10, 30 and 30', except that light diffuser 50 may be moved between its flattened, compact form and its open, erected form without removing the mounting means 57 or the front diffuser panel 61. Front panel 61 will have to be removed to gain access to the accessory mounting means 64.

In the drawings and specifications, there has been set forth a preferred embodiment of the invention, and although specific terms are employed, they are used in a generic and descriptive sense only and not for purpose of limitation.

That which is claimed is:

1. A photographic light diffuser characterized by being readily collapsible into a compact, very portable form and by being readily extendible into a self-supporting, operative form for connection to and use with a suitable light source, said diffuser comprising a tubular body open at its opposite ends and comprising opposed pairs of interconnected panels formed of opaque material having a light-reflective surface on the inner surface thereof, said panels being sufficiently stiff to maintain said body in open tubular form when said diffuser is connected to a light source, at least one of said opposing pairs of panels having fold lines therein defining hinge areas along which said panels may be folded to collapse said tubular body into a compact, flattened form for easy portability, means at one end of said tubular body for mounting said light diffuser on a light source, and a light diffusing panel mounted on said tubular body adjacent the other end of said body and spanning the opening through said tubular body.

2. A photographic light diffuser according to claim 1 wherein said light diffusing panel is removably mounted on said tubular body.

3. A photographic light diffuser according to claim 1 which is adapted for use with a hand-held photographic light source and wherein said inner end thereof is formed to snugly receive the outer end of the light source therein.

4. A photographic light diffuser according to claim 3 wherein said mounting means comprises cooperable hook and loop means for attaching said light diffuser to a light source.

5. A photographic light diffuser according to claim 3 wherein said mounting means comprises elastic means surrounding said one end of said tubular body for retaining said tubular body on said light source.

6. A photographic light diffuser according to claim 1 wherein said mounting means comprises a mounting plate connected to said tubular body at said one end and is adapted to be mounted on a photographic light source.

7. A photographic light diffuser according to claim 1 wherein said opposing pairs of panels comprise one pair of top and bottom panels and another pair of side panels, and wherein at least said side panels have said fold lines therein.

8. A photographic light diffuser according to claim 7 wherein said fold lines extend from said one end to said other end of said tubular body in medial portions of said side panels.

9. A photographic light diffuser according to claim 7 wherein, both of said opposing pairs of panels have fold lines therein.

10. A photographic light diffuser according to claim 9 wherein each of said panels have a plurality of fold lines therein and said fold lines extend transversely of said panels parallel to said one end thereof such that said panels form accordion-type folds.

11. A photographic light diffuser adapted for use with a hand-held photographic light source and characterized by being collapsible into a compact, portable form while being self-supporting when extended and mounted on a light source, said diffuser comprising a tubular body open at opposite ends and comprising a first pair of opposing top and bottom wall panels and a second pair of opposing side wall panels interconnected along contiguous edges, said panels being formed of opaque material having a light-reflective surface on the inside of said panels and being of sufficient stiffness to maintain said body in open, tubular form when said diffuser is mounted on a light source, at least one pair of said wall panels having fold lines therein extending between the open ends of said tubular body and along which said wall panels are adapted to be folded to collapse said diffuser into a flattened, compact, portable form, one end of said tubular body being of a size and shape to receive the light-emitting portion of a hand-held photographic light source therein, and a front panel of flexible, translucent material connected to said top, bottom and side wall panels adjacent the other end of said tubular body and extending across the interior of said tubular body in spaced relation to said one end thereof, whereby light emitted by a light source will be diffused by said front panel when said diffuser is mounted on a light source and when said diffuser is removed from the light source, the diffuser may be collapsed into a flattened, compact, portable form.

12. A photographic light diffuser according to claim 11 wherein said front panel is fixedly connected to said top, bottom and side wall panels.

13. A photographic light diffuser according to claim 11 wherein said top, bottom and side wall panels are multilayered, with an opaque layer on the outside of said panel and a light-reflective layer on the inside thereof.

14. A photographic light diffuser according to claim 13 including a layer of stiffening material disposed between said outer and inner layers.

15. A photographic light diffuser according to claim 14 including means carried by said one end of said tubular body for attaching said light diffuser to a light source.

16. A photographic light diffuser adapted to be mounted on a photographic light source and characterized by being collapsible into a compact, portable form, said diffuser comprising a tubular body comprising a first pair of opposing panels defining the top and bottom walls of said body and a second pair of opposing panels defining the side walls of said body, said top, bottom and side wall panels being connected along their contiguous edges, said panels being formed of an opaque material having a light-reflective surface on the inside of said panels, said panels having sufficient stiffness to support said tubular body in an extended, operative form when mounted on a light source, at least one pair of opposing panels having fold lines therein defining hinged areas about which said panels may be folded to collapse said tubular body into a flattened, compact, portable form, a front panel of flexible, translucent material connected to said top, bottom and side wall panels adjacent the outer end thereof and spanning the open, interior of said tubular body, and a mounting plate disposed at the inner end of said tubular body and connected to said tubular body for mounting said tubular body on a photographic light source.

17. A photographic light diffuser according to claim 16 wherein said side wall panels have said fold lines therein.

18. A photographic light diffuser according to claim 17 wherein said fold lines extend between said front panel and said mounting plate in a medial portion of said side wall panels.

19. A photographic light diffuser according to claim 16 wherein said mounting plate is removably connected to said tubular body.

20. A photographic light diffuser according to claim 19 including snap fastener means mounted on said tubular body and said mounting plate for removably connecting said mounting plate to said tubular body.

21. A photographic light diffuser according to claim 16 wherein said front panel is removably connected to said tubular body wall panels.

22. A photographic light diffuser according to claim 21 including hook and loop fastener means carried by said front panel and said wall panels of said tubular body for removably connecting said front panel to said tubular body.

23. A photographic light diffuser according to claim 16 wherein said front panel is connected to said tubular body wall panels at the outer ends thereof.

24. A photographic light diffuser according to claim 16 wherein said front panel is connected to said tubular body wall panels at a location intermediate the ends thereof.

25. A photographic light diffuser adapted to be mounted on a photographic light source and characterized by being collapsible into a compact, portable form, said diffuser comprising a tubular body comprising a first pair of opposing panels defining the top and bottom walls of said body and a second pair of opposing panels defining the side walls of said body, said top, bottom and side wall panels being connected along their contiguous edges, said panels being formed of an opaque material having a light-reflective surface on the inside of said panels, said panels having sufficient stiffness to support said tubular body in an extended, operative form when mounted on a light source, said panels having accordion-type folds therein such that said tubular body is in the form of a bellows, said tubular body being collapsible into a flattened, compact, portable form, a front panel of flexible, translucent material connected to said top, bottom and side wall panels adjacent the outer end thereof and spanning the open, interior of said tubular body, and a mounting plate disposed at the inner end of said tubular body and connected to said tubular body for mounting said tubular body on a photographic light source.

* * * * *